(12) United States Patent
Langhorst et al.

(10) Patent No.: US 10,344,114 B2
(45) Date of Patent: Jul. 9, 2019

(54) ADDITIVE MANUFACTURING PROCESS

(71) Applicant: Ford Global Technologies, LLC, Dearborn, MI (US)

(72) Inventors: Amy Ellen Langhorst, Ann Arbor, MI (US); Ellen Cheng-chi Lee, Ann Arbor, MI (US); Deborah Frances Mielewski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/874,362

(22) Filed: Jan. 18, 2018

(65) Prior Publication Data

US 2018/0142054 A1 May 24, 2018

Related U.S. Application Data

(63) Continuation of application No. 15/352,072, filed on Nov. 15, 2016, now Pat. No. 9,920,154.

(51) Int. Cl.

| *C08F 2/46* | (2006.01) |
|---|---|
| *C08F 2/50* | (2006.01) |
| *C08G 61/04* | (2006.01) |
| *C08F 283/00* | (2006.01) |
| *C08L 51/08* | (2006.01) |
| *C09D 151/08* | (2006.01) |
| *B33Y 70/00* | (2015.01) |
| *B33Y 10/00* | (2015.01) |
| *C08K 3/34* | (2006.01) |

(52) U.S. Cl.
CPC .......... *C08F 283/006* (2013.01); *B33Y 10/00* (2014.12); *B33Y 70/00* (2014.12); *C08K 3/346* (2013.01); *C08L 51/08* (2013.01); *C09D 151/08* (2013.01); *C08L 2205/16* (2013.01)

(58) Field of Classification Search
CPC .. C08F 283/006; C08L 51/08; C08L 2205/16; C08L 75/14; C08K 3/34; C08K 3/346; B33Y 70/00; B33Y 10/00; C09D 151/08

USPC ................ 522/63, 6, 71, 189, 184, 1; 520/1
See application file for complete search history.

(56) References Cited

U.S. PATENT DOCUMENTS

| 4,629,667 A * | 12/1986 | Kistner | ................. G03C 9/00 430/11 |
|---|---|---|---|
| 8,025,940 B2 | 9/2011 | Hashimoto | |
| 2008/0258345 A1 | 10/2008 | Bens et al. | |
| 2015/0361270 A1 | 12/2015 | Tasaki et al. | |

FOREIGN PATENT DOCUMENTS

| CN | 105404095 A | 3/2016 | |
|---|---|---|---|
| EP | 0535828 A1 | 4/1993 | |
| EP | 1434089 A1 * | 6/2004 | ........... G03F 7/0037 |
| EP | 1434089 A1 | 6/2004 | |

OTHER PUBLICATIONS

Kumar, S. et al., "Reinforcement of Stereolithographic Resins for Rapid Prototyping with Cellulose Nanocrystals", ACS Appl. Mater. Interfaces, 2012, pp. 5399-5407.
Patel, M. M. et al., "UV-curable Polyurethane Coatings Derived from Cellulose", Iranian Polymer Journal, 2009, pp. 903-915.
Xu, Yuzhi et al, Chemical Modification of Soy Flour Protein and Its Properties, Advanced Materials Research, vols. 343-344, Sep. 27, 2011, pp. 875-881.

* cited by examiner

*Primary Examiner* — Jessica Whiteley
(74) *Attorney, Agent, or Firm* — Julia Voutyras; Brooks Kushman P.C.

(57) ABSTRACT

An additive manufacturing method. The method includes mixing a reflective material including fibers with a photopolymer resin to form a resin mixture having a loading of the reflective material of at least 3 wt. %. The method further includes curing the resin mixture using a light source to form first and second individually cured layers and a bridge of a portion of the fibers between the two layers.

16 Claims, 3 Drawing Sheets

ADDITIVE MANUFACTURING PROCESS

CROSS-REFERENCE TO RELATED APPLICATIONS

This application is a continuation of U.S. application Ser. No. 15/352,072 filed Nov. 15, 2016, and issued as U.S. Pat. No. 9,920,154 on Mar. 20, 2018, the disclosure of which is hereby incorporated in its entirety by reference herein.

TECHNICAL FIELD

The present disclosure relates to an additive manufacturing method using a resin mixture with reflective fibers.

BACKGROUND

Additive manufacturing, also referred to as 3D printing, is a manufacturing process that allows for layer-by-layer fabrication of a component. There are numerous types of additive manufacturing processes, which may use inkjet-style printers, laser curing/sintering, light-based curing, or other techniques. One additive manufacturing process, known as stereolithography, may use ultraviolet (UV) light to photopolymerize a liquid resin one layer at a time to build-up a component. While additive manufacturing can be very cost and time effective for producing one part or a small number of parts, its cycle time is generally considerably slower than typical mass production processes, such as injection molding.

SUMMARY

In at least one embodiment, an additive manufacturing method is disclosed. The method includes mixing a reflective material including fibers with a photopolymer resin to form a resin mixture having a loading of the reflective material of at least 3 wt. %. The method further includes curing the resin mixture using a light source to form first and second individually cured layers and a bridge of a portion of the fibers between the two layers.

In one embodiment, an additive manufacturing method is disclosed. The method includes mixing cellulose fibers with a photopolymer resin to form a resin mixture having a loading of the cellulose fibers of at least 3 wt. %; and curing the resin mixture using a light source to form first and second individually cured layers and a bridge of a portion of the cellulose fibers between the two layers.

In another embodiment, an additive manufacturing method is disclosed. The method includes mixing cellulose fibers with a photopolymer resin to form a resin mixture having a loading of the cellulose fibers of at least 3 wt. %; and curing the resin mixture using a light source to form first and second individually cured layers and a link of a portion of the cellulose fibers between the two layers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
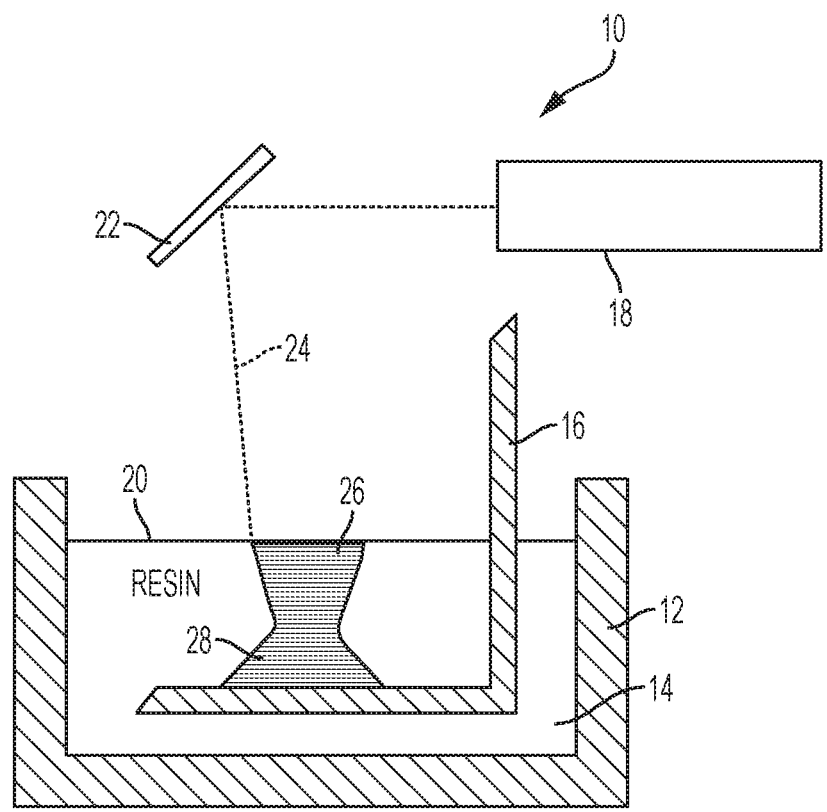
FIG. 1 is a schematic example of a stereolithography (SLA) additive manufacturing process.

With reference to FIG. 1, an example of an additive manufacturing system 10 is shown. Additive manufacturing may also be referred to as 3D printing or rapid prototyping. There are numerous types of additive manufacturing processes, which may use inkjet-style printers, laser curing/sintering, light-based curing, or other techniques. In general, additive manufacturing includes a layer-by-layer build-up of a component, rather than forming a component in one single step (e.g., casting or injection molding). Additive manufacturing allows for custom manufacturing of components without significant changes in tools or equipment, since the layer-by-layer building instructions can be stored in software instead of hardware. While additive manufacturing can be very cost and time effective for producing one part or a small number of parts, its cycle time is generally considerably slower than typical mass production processes, such as injection molding.

One additive manufacturing process, known as stereolithography (SLA), may use ultraviolet (UV) light to photopolymerize a liquid resin one layer at a time to build-up a component. The system 10 is an example of an SLA system, however, it is to be understood that SLA systems may have multiple designs and the specific components and/or functions described herein are not intended to be limiting. One of ordinary skill in the art will understand that, based on the present disclosure, modifications or adjustments to the SLA system may be made. In addition, the present disclosure is applicable to additive manufacturing techniques in general, with SLA merely being an example. Accordingly, one of ordinary skill in the art will understand that the present disclosure may be adapted to be used in any type of additive manufacturing technique.

The system 10 may include a container, tank, or vat 12 of liquid resin 14. The liquid resin 14 may be any resin that is curable by light, such as ultraviolet (UV) or visible light. A support plate or platform 16 may be positioned within the vat 12 and may be configured to move vertically within the vat 12 and resin 14. In some embodiments, the platform 16 may be movable in additional directions, for example, in the X-Y plane in addition to the Z direction. The system 10 may also include a light source 18 that is configured to shine or trace an image or pattern onto a top surface 20 of the liquid resin 14. In the embodiment shown, the light source 18 is a laser. The laser may trace a pattern onto the top layer 20 of the resin 14 by scanning across the surface in a path controlled by a controller (e.g., with instructions stored in/implemented by software). The laser may directly contact the top layer 20, or there may be one or more optical devices 22 (e.g., mirrors) positioned to reflect or guide the laser.

When the laser beam 24 contacts the top layer 20 of the liquid resin 14, the resin may be cured or solidified into a solid polymer. This process may be referred to as photopolymerization. Accordingly, by tracing a pattern on the top layer 20 of the resin with the laser, a solid layer 26 of a component 28 may be formed. The solid layer 26 corresponds to a cross-section of the component having a certain thickness. When one layer has been completed, the platform 16 may be lowered in the vat 12 such that a new top layer 20 of liquid resin 14 covers the solid layer 26 that was just formed. A new solid layer 26 may then be formed by tracing a pattern with the laser. This process may be repeated until a completed component 28 is formed having a plurality of solid layers 26 stacked in the Z-direction.

As described above, SLA systems may have a variety of designs, and the system 10 is merely one example. A person of ordinary skill in the art will understand that variations or modifications of the system 10 may be used in accordance with the present disclosure. For example, while the system 10 is shown and described with the component 28 moving downward after each layer 26 is solidified, some systems may do the opposite. In some designs, the part may be moved upward after each layer is solidified from the bottom. In these designs, there may be a transparent window in the bottom of the vat to allow a light source to travel therethrough and solidify a bottom layer of liquid resin in the vat. The component may then be raised and a new layer of liquid resin is formed in the bottom of the vat. In addition, light sources other than a laser may be used. For example, light (e.g., UV light) may be projected onto the liquid resin in a two-dimensional (2D) image such that it solidifies the resin in the layer all at once.

Additive manufacturing techniques, such as SLA, are generally quite cost and time efficient for making prototype parts or for very low volume production runs, since they do not require new tooling and equipment for each design iteration. However, additive manufacturing is generally not competitive with traditional high-volume manufacturing processes, particularly for plastic parts, such as injection molding, compression molding, blow molding, etc., because the latter have very short cycles times per part (e.g., less than 30 seconds).

In an attempt to reduce cycle times, additional components have been added to the polymer resins to improve (reduce) their cure times. For example, reactive diluents, such as vinyl compounds, may be added to speed up the curing process. However, the addition of these accelerators may have drawbacks, such as increased resin toxicity, heat generation, and/or local viscosity changes within the resin during printing. In addition to diluents (if present), light-curable resins, or photopolymers, may include photoinitiators, which are molecules that creates reactive species (free radicals, cations or anions) when exposed to radiation (e.g., UV or visible light). The resins may also include pigments to give the polymer a certain color.

Another byproduct of the layer-by-layer production in additive manufacturing is the potential for anisotropic properties in the finished component. Because each layer in the component cures separately, the mechanical properties in the print direction (e.g., Z-direction in FIG. 1) may be lower than the in-plane or in-layer direction (e.g., X-Y plane). Without being held to any particular theory, it is believed that the separate curing of each layer may reduce the adhesion strength between layers. This may lead to delamination or fracturing/failure of the component at lower loads.

In an attempt to overcome this anisotropic property of the additive manufacturing process, Applicant theorized that adding fibers to the polymer resin may improve the adhesion strength between the layers and reduce the anisotropy of the mechanical properties. It was believed that the fibers may form a link or bridge between the two layers and improve the strength of the interlayer adhesion. For example, if a portion of the fibers from a first layer are exposed following the curing of the layer and a new layer is solidified around the exposed fiber portions, the fibers may provide a bridge between the two layers.

While investigating the potential mechanical property benefits of adding fibers to a photopolymer resin, testing was performed to determine the cure dosage of the resins having cellulose fibers included therein. The cure dosage may be defined as the amount of light or light energy needed to cure a certain amount of the resin. During this testing, it was surprisingly discovered that the addition of the cellulose fibers significantly reduced the cure time of the resin.

Without being held to any particular theory, several potential explanations for the reduced cure time have been developed. One potential explanation is that the cellulose fibers act to reflect the light (e.g., UV or visible light) within the liquid resin during the photopolymerization process. In general, when the light source is applied to the liquid resin in the additive manufacturing process (e.g., SLA), the light is coming from a single direction that is generally perpendicular to the layer of liquid resin. The light then travels into/through the resin in only this direction. It is believed that the cellulose fibers may cause some of the light entering the liquid resin to reflect or scatter in a different direction. This reflection of the light may cause more of the light energy to be absorbed by the resin and used to cure it.

A second potential explanation may be that the cellulose fibers displace a portion of the resin that would otherwise need to be cured by the light. A reduction in the amount of resin that needs to be cured may therefore reduce the total cure time for a given component. While this mechanism may play a role in the reduced cure time, it is believed that it is not the sole mechanism. As will be described in greater detail below, several different materials were independently added to the resin and resulted in reductions of the curing time by a significant amount, even at relatively low concentrations by weight. In several of the materials tested, the reductions in cure time on a percentage basis were much greater than the weight percent of the resin that was displaced. It therefore stands to reason that displacement was not the only mechanism involved.

In addition, one material that was tested, graphene, actually increased the cure time of the resin. It is believed that graphene may have hindered the cure time because it is black, and therefore absorbs visible light. By absorbing the light energy from the light source, there may have been less available to cure the resin. This behavior appears to support the first potential explanation, that the cellulose, which is white, reflects some of the light energy and therefore speeds the curing time of the liquid resin. To support this theorized explanation, several additional white or near-white materials were tested: soy flour and talc powder. Both materials also improved the cure time of the photopolymer resin, increasing the plausibility of the reflective theory.

In at least one embodiment, a method is provided in which a material is mixed with a photopolymer resin to reduce the cure time of the resin. The material may be mixed with the photopolymer resin prior to introducing it into the vat. In one embodiment, the material may be white or near-white in color. As used herein, a material that is white may be a material that reflects all or substantially all visible light. A near-white material may be a material that reflects most visible light, for example, at least 75%, 80%, 85%, 90%, or 95% of the visible light spectrum. These materials may appear to be off-white or slightly yellow/beige. The materials disclosed herein, cellulose fibers, talc powder, and soy flour, all meet this definition of white or near-white. While these three white/near-white materials have been tested and found to be effective at reducing cure times, the present disclosure is not intended to be limited to these materials. Instead, it is contemplated that any suitable additive or filler that is white or near-white in color may have a similar effect. The magnitude of the effect may vary depending on the material used and its properties (e.g., geometry, material properties, surface finish, etc.). These materials may be referred to as light reflective materials.

In general, it has been found that the reduction in cure time improves with additional loading of the light reflective materials. Stated another way, as the loading of the light reflective materials increases, the cure time of the photopolymer decreases. The quantity of the light reflective material that may be included in the resin may vary depending on the material used, its geometric properties, the composition of the resin, the constraints of the particular additive manufacturing process being used, or others. For example, in certain additive manufacturing processes, the viscosity of the liquid resin may be a limiting factor on the loading of the reflective material. In one example, it was found that high-aspect ratio cellulose fibers (e.g., 200+ μm in length) had a practical limit of about 5 wt. % in an SLA process before the viscosity began to be too high. Other materials or geometries may have significantly higher weight fractions before adversely affecting the viscosity, however. For example, lower-aspect ratio cellulose fibers (e.g., 8 μm in length) were able to be loaded at upwards of 20 wt. % in certain resins while still being able to be produced/printed.

In at least one embodiment, one or more reflective materials (e.g., cellulose fibers, talc powder, or soy flour) may be included in a photopolymer resin at a total loading of at least 2% by weight, for example, at least 5%, 8%, 10%, 15%, or 20% by weight. In another embodiment, the reflective material may be included in a photopolymer resin at a loading of 2-20% by weight, or any sub-range therein, such as 3-20%, 4-20%, 5-20%, 8-20%, 10-20%, 3-15%, 3-10%, 5-15%, 5-10%, or others. If more than one reflective material is used, the composition may be evenly split among the different reflective materials. For example, if there are two reflective materials, the overall composition of the reflective material may be a 50/50 split by weight. However, there may be any distribution of the reflective materials, such as 60/40, 70/30, 80/20, 90/10 or others.

The reflective material(s) may be considered a filler material. A filler material may be defined as any material that is not the base photopolymer resin (e.g., the bulk polymer), a photoinitiator, or a pigment (optional). For example, for a polyurethane resin, the primary or base ingredients may include polyol, diisocyanate, acrylate blocking unit, chain extender (e.g., diamine), diluent, photoinitiator, dye. Any additives in addition to these components may be considered fillers. In one embodiment, the reflective material or materials may be the only filler material in the total photopolymer resin composition or substantially the only filler (e.g., at least 99 wt/vol. %). In another embodiment, the reflective material(s) may comprise at least 50% of the total filler loading by weight or by volume, for example, at least 60%, 70%, 80%, 90%, or 95%. In one embodiment, the total filler loading in the resin may be at most 25% by weight or by volume, for example, at most 20% or 15%. Accordingly, the reflective material(s) may account for all, or close to all, of the total filler loading. Other filler materials may increase the viscosity of the resin to unacceptable levels and/or counteract the reduction in cure time provided by the reflective materials(s).

In at least one embodiment, cellulose fibers may be included in the photopolymer resin. Cellulose fibers may be made with ether or esters of cellulose, which may be obtained from plant-based material, such as bark, wood, or leaves. As described above, cellulose is white in color. The cellulose fibers may be natural or manufactured. In one embodiment, the fibers may have a length (e.g., on a long axis) of at least 3 μm, for example, at least 5 μm or at least 8 μm. In another embodiment, the fibers may have a length of 3-500 μm, or any sub-range therein, such as 3-250 μm, 5-250 μm, 3-50 μm, 3-25 μm, 3-10 μm, 5-25 μm, 5-10 μm, 100-500 μm, 100-300 μm, 150-250 μm, or others. However, cellulose fibers having lengths smaller or larger than those disclosed may also be used.

The width of the fibers may be less than the length of the fibers (e.g., such that there is an aspect ratio of >1). In one embodiment, the fibers may have a diameter or width of 0.1-50 μm, or any sub-range therein, such as 0.3-50 μm, 0.5-50 μm, 1-50 μm, 0.5-35 μm, 1-35 μm, 0.5-20 μm, 1-20 μm, 0.5-10 μm, 1-10 μm, or others. In another embodiment, the fibers may have a diameter of less than 35 μm, 20 μm, 10 μm, or 5 μm. In another embodiment, the fibers may have a diameter of at least 0.3 μm, 0.5 μm, 1 μm, 5 μm, or 10 μm. However, cellulose fibers having widths smaller or larger than those disclosed may also be used.

In at least another embodiment, talc may be included in the photopolymer resin. The talc may be included as a powder. Talc is a clay mineral composed of hydrated magnesium silicate. As described above, talc/talc powder is white in color. The talc powder may have an average particle size of 1-200 μm, or any sub-range therein, such as 1-100 μm or 1-50 μm. In at least another embodiment, soy flour may be included in the photopolymer resin. Soy four is formed from soybeans. Soy flour may be formed by grinding soybeans into a fine powder, for example, fine enough to pass through a 100-mesh or smaller screen (e.g., <150 μm average particle size). As described above, talc/talc powder may be white or near-white in color. Cellulose fibers and soy flour are both organic materials, while talc powder is inorganic. Accordingly, the reflective materials may be either organic or inorganic (or both, if multiple are used).

Additive manufacturing techniques, such as SLA, may use a light source to cure or photopolymerize a polymer resin. In some embodiments, the light source may be a visible light source or a UV light source. Visible light has a wavelength of about 400 to 700 nm, while UV light has a wavelength of about 10 to 400 nm. As described above, it is believed that white or near-white materials may reflect at least a portion of the light that hits the material, thereby reducing the cure time of the resin. It is believed that the reflective materials may be particularly effective for UV light that is near the visible light wavelength in the spectrum (e.g., close to 400 nm). Accordingly, in at least one embodiment, a UV source that emits light having a wavelength of at least 350 nm may be used in conjunction with resin including the reflective material(s). For example, the UV source may emit light having a wavelength of at least 375 nm. In one embodiment, the UV source may emit light having a wavelength of 350-425 nm, or any sub-range therein, such as 375-425 nm, 375-400 nm, or 380-400 nm. In one embodiment, the wavelength of the light may be about 385 nm (e.g., ±5 nm).

The present disclosure is applicable to all photopolymers (e.g., those cured by light or other electromagnetic radiation). In some embodiments, the reflective material(s) may be included in so-called prototyping resins, which generally have relatively fast cure times but relatively poor mechanical properties. Prototyping resins may be used to create prototypes for visual, spatial, or proof-of-concept purposes, but that do not typically go into production or commercial use. Examples of classes of prototyping resins may include polyurethane based resins (e.g., polyurethane acrylates) or cyanate ester based resins. However, the reflective material(s) may also be included in other resin types, including those that are used to create production or commercial-level components. Indeed, reduced cure times may be more beneficial to these resins, since cycle time is currently a drawback to large-scale production by additive manufacturing.

In one embodiment, the disclosed reflective material(s) may be used in engineering resins, which may be those having mechanical properties suitable for production/commercial parts. Some engineering resins may have two-part formulations, including a base resin and a hardener or curing agent. Once mixed together, the liquid resin may have a predetermined time period before it hardens. In additive manufacturing, two-part resins may have a limited time in which to "print" the mixed resin before it becomes too viscous or solid. This time may be referred to as a pot life. Accordingly, if an additive manufacturing process includes a vat of mixed two-part resin, the size of the printed object may be limited by the cure time of the resin. If the cure time is reduced, such as through the addition of reflective materials, a larger part may be printed before the pot life runs out.

Figure 2:
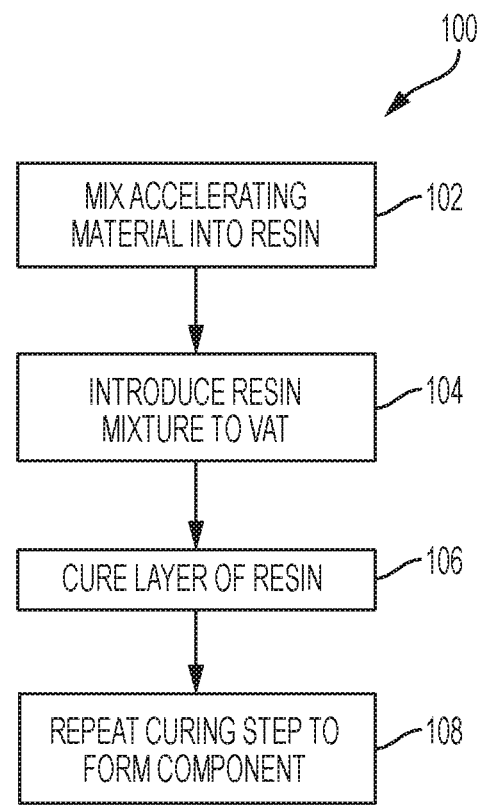
FIG. 2 is a flowchart of a method of accelerating the cure time of a resin in an additive manufacturing process, according to an embodiment.

With reference to FIG. 2, an example flowchart 100 is shown for a method of accelerating the cure time of an additive manufacturing process. The flowchart 100 reflects the processes and steps described above. In step 102, an accelerating material may be added to a photopolymer resin. The accelerating material may be a material that reflects most or all of the visible spectrum of light (e.g., a white or near-white material). For example, the material may be cellulose fibers, talc powder, soy flour, or other materials. In step 104, the resin having the accelerating material mixed in may be introduced into a vat, pot, cartridge, or other container associated with an additive manufacturing process. For example, in an SLA process, the mixed resin may be introduced into a vat and in a 3D printing process it may be introduced into a printing cartridge or container connected to a nozzle/needle.

In step 106, a layer of the mixed resin may be cured. In some embodiments, the curing may be performed using electromagnetic radiation (e.g., a type of light). In one embodiment, the EM radiation may be ultraviolet (UV) light or visible light. In other embodiments, the curing may be performed by heat or allowing the resin to cure naturally (e.g., at ambient conditions). In an SLA process, the mixed resin may be cured by exposing a top or bottom surface of the mixed resin to UV or visible light. For example, a laser may trace a pattern on the surface or a 2D shape may be projected onto the surface using a bulb or lamp. In step 108, the curing process of step 106 may be repeated one or more times to build-up an article or component in a layer-by-layer process (additive manufacturing). The number of times the curing step is repeated may depend on the component being formed and the particular properties of the additive manufacturing technique. The accelerating material may reduce the time the resin takes to cure in step 106, which may allow the repeating of step 106 to take place in a shorter amount of time.

EXAMPLES

Figure 3:
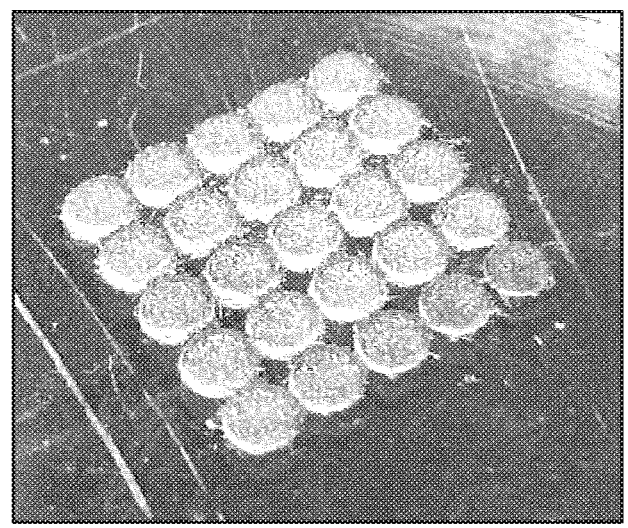
FIG. 3 is a photograph of cure dosage test samples of prototyping resin including cellulose fibers.

With reference to FIG. 3, examples are shown of multiple cure dosage dots that were printed using SLA. As described above, the cure time reducing effect of the cellulose fibers was discovered while determining the cure dosage of the resin including the cellulose fibers. FIG. 3 shows examples of cure dosage test dots for a polyurethane acrylate resin with 1 wt. % cellulose fibers included (200 μm fibers).

Figure 4:
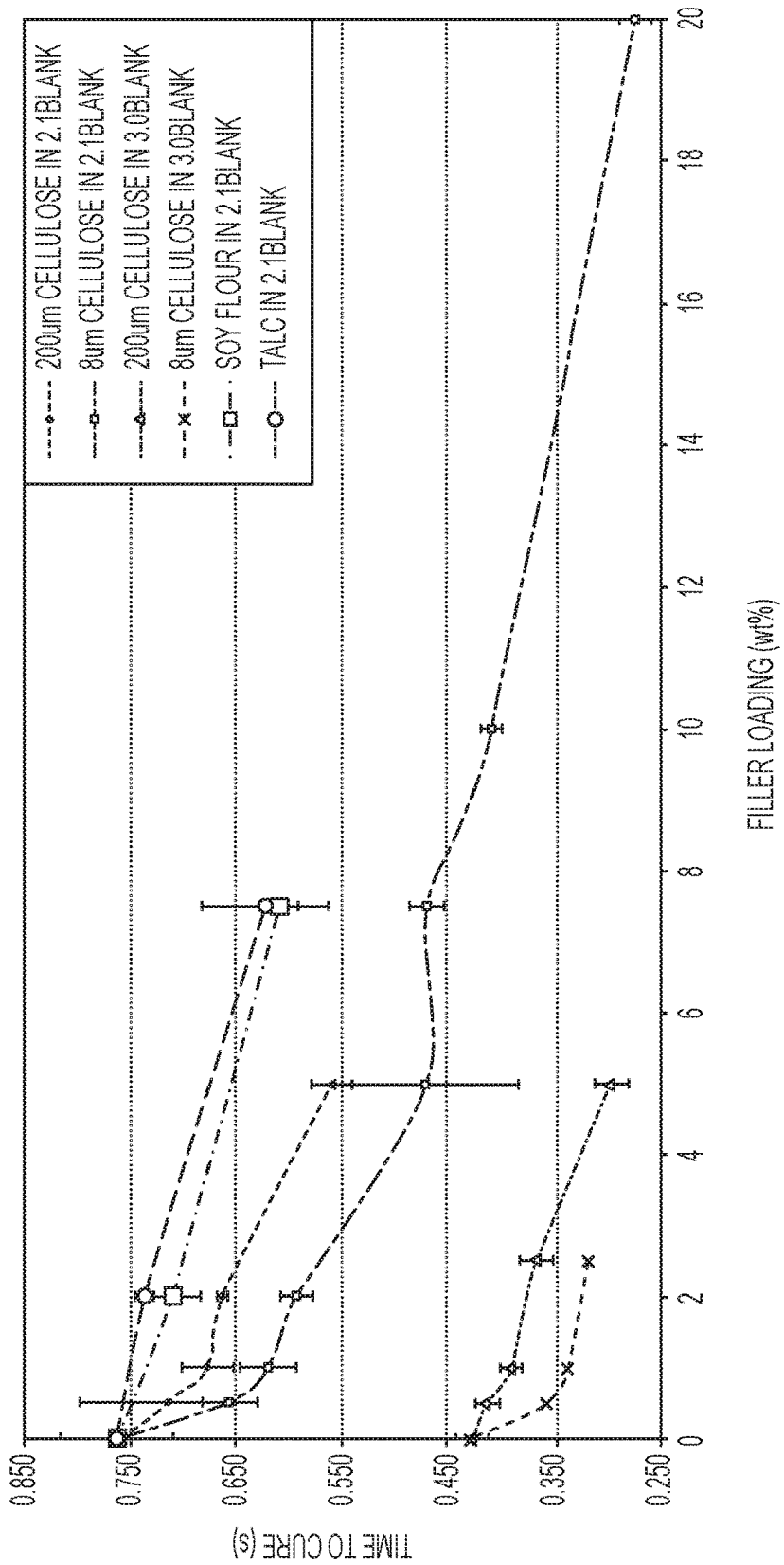
FIG. 4 is experimental data showing that several reflective materials reduce the cure time of photopolymer resins exposed to UV light.

With reference to FIG. 4, cure time data is shown for a number of different reflective materials and loadings. Two different polyurethane acrylate resin compositions were used, both were prototyping resins supplied by Carbon3D, Inc. The resins will be referred to as RP1 and RP2. As shown in the graph, the cure times of RP1 and RP2 without any reflective filler material are about 0.76 seconds and about 0.43 seconds, respectively. Varying loads of cellulose fibers (two different lengths), talc powder, and soy flour were added to each resin and the cure times were tested to determine the effect of the reflective materials.

As shown, each of the materials reduced the cure time of RP1 and both cellulose fiber sizes reduced the cured time of RP2 (only cellulose was tested). In addition, each material reduced the cure time to a greater degree with increased loading. Loadings of 5 wt. % of 200 μm cellulose fiber reduced the cure time of RP1 from 0.76 seconds to 0.56 seconds and the cure time of RP2 from 0.43 seconds to 0.3 seconds, an approximately 24% and 30% reduction, respectively. The 8 μm cellulose fibers were tested at various loads in the RP1 resin up to 20 wt. %. At 5 wt. %, the cure time was reduced to 0.47 seconds (~38% reduction), at 10 wt. % it was reduced to 0.41 seconds (~46% reduction), and at 20 wt. % it was reduced to 0.28 seconds (~63% reduction). The 8 μm cellulose fibers were tested at several relatively low loads in the RP2 resin. Despite the lower loads, the 8 μm cellulose fibers still reduced the cure time by about 17% (0.5 wt. %), 22% (1.0 wt. %), and 26% (2.5 wt. %). Accordingly, both cellulose fiber types were able to substantially reduce the cure times of both resins. Significantly, the decreased cure times were disproportionately higher than the amount of displaced resin.

The talc powder and the soy flour were each tested at two different loadings in the RP1 resin. The results were similar for both materials, with soy flour causing a slightly larger decrease in the cure time. Talc powder reduced the cure time by about 3% at a 2 wt. % loading and 18% at a 7.5 wt. % loading. Soy flour reduced the cure time by about 7% at a 2 wt. % loading and 20% at a 7.5 wt. % loading. Accordingly, both talc powder and soy flour were able to reduce the cure times of the RP1 resin. The cure times were disproportionately higher than the amount of displaced resin, particularly at higher loadings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An additive manufacturing method, comprising:
mixing a reflective material including fibers with a photopolymer resin to form a resin mixture having a loading of the reflective material of at least 3 wt. %;
curing a first uncured layer of the resin mixture using a light source to form a first cured layer exposing a portion of the fibers;
applying a second uncured layer of the resin mixture to the first cured layer; and
curing a second layer of the resin mixture using the light source to form a second cured layer solidifying around the exposed portion of the fibers.

2. The method of claim 1, wherein the reflective material includes cellulose fibers.

3. The method of claim 1, wherein the fibers have a length of 5-250 μm.

4. The method of claim 1, wherein the reflective material includes talc powder.

5. The method of claim 1, wherein the reflective material includes soy flour.

6. An additive manufacturing method, comprising:
mixing a reflective material including fibers with a photopolymer resin to form a resin mixture having a loading of the reflective material of at least 3 wt. %;
curing a first uncured layer of the resin mixture using a light source to form a first cured layer exposing a portion of the fibers; and
applying a second uncured layer of the resin mixture to the first cured layer; and
curing a second layer of the resin mixture using the light source to form a second cured layer solidifying around the exposed portion of the fibers,
the light source has a wavelength of at least 350 nm.

7. The method of claim 6, wherein the light source has a wavelength of 375 to 425 nm.

8. The method of claim 6, wherein the reflective material includes cellulose fibers.

9. The method of claim 6, wherein the fibers have a length of 5-250 μm.

10. The method of claim 6, wherein the reflective material includes talc powder.

11. The method of claim 6, wherein the reflective material includes soy flour.

12. An additive manufacturing method, comprising:
mixing a reflective material including fibers with a photopolymer resin to form a resin mixture having a loading of the reflective material of at least 3 wt. %;
curing a first uncured layer of the resin mixture using a light source to form a first cured layer exposing a portion of the fibers; and
applying a second uncured layer of the resin mixture to the first cured layer; and
curing a second layer of the resin mixture using the light source to form a second cured layer solidifying around the exposed portion of the fibers,
the reflective material reflects at least 80% of the visible light spectrum.

13. The method of claim 12, wherein the reflective material reflects at least 95% of the visible light spectrum.

14. The method of claim 12, wherein the reflective material includes cellulose fibers.

15. The method of claim 12, wherein the fibers have a length of 5-250 μm.

16. The method of claim 12, wherein the reflective material includes talc powder.

* * * * *